(12) United States Patent
Mack et al.

(10) Patent No.: US 9,014,507 B2
(45) Date of Patent: Apr. 21, 2015

(54) AUTOMATIC TRACKING MATTE SYSTEM

(71) Applicant: Lightcraft Technology, LLC, Venice, CA (US)

(72) Inventors: Newton Eliot Mack, Venice, CA (US); Philip R. Mass, Portland, OR (US)

(73) Assignee: Lightcraft Technology LLC, Venice, CA (US)

( * ) Notice: Subject to any disclaimer, the term of this patent is extended or adjusted under 35 U.S.C. 154(b) by 0 days.

(21) Appl. No.: 14/209,403

(22) Filed: Mar. 13, 2014

(65) Prior Publication Data

US 2014/0192147 A1 Jul. 10, 2014

Related U.S. Application Data

(63) Continuation of application No. PCT/US2012/067460, filed on Nov. 30, 2012.

(60) Provisional application No. 61/565,884, filed on Dec. 1, 2011.

(51) Int. Cl.
*G06K 9/36* (2006.01)
*G06T 19/00* (2011.01)
*G06T 11/00* (2006.01)
*H04N 5/265* (2006.01)
*H04N 13/00* (2006.01)
*G06T 19/20* (2011.01)

(52) U.S. Cl.
CPC .............. *G06T 19/006* (2013.01); *G06T 11/00* (2013.01); *H04N 5/265* (2013.01); *H04N 13/004* (2013.01); *G06T 19/20* (2013.01)

(58) Field of Classification Search
CPC ..... G06T 13/60; G06T 15/60; G06T 2210/56; G06T 3/0018; G06T 5/006; G06T 17/20; G06T 2207/20096; G06K 9/00201; G06K 9/0075; H04N 5/262; H04N 5/272; A01K 11/008; A01K 29/00; A22B 5/007; A22B 5/201

See application file for complete search history.

(56) References Cited

U.S. PATENT DOCUMENTS

| | | | |
|---|---|---|---|
| 5,714,997 | A | 2/1998 | Anderson |
| 6,134,346 | A | 10/2000 | Berman et al. |
| 6,208,347 | B1 | 3/2001 | Migdal et al. |
| 6,342,884 | B1 | 1/2002 | Kamen et al. |
| 6,445,810 | B2 | 9/2002 | Darrell et al. |
| 6,867,772 | B2 | 3/2005 | Kotcheff et al. |
| 6,974,373 | B2 | 12/2005 | Kriesel |
| 7,142,709 | B2 | 11/2006 | Girard |
| 7,692,647 | B2 | 4/2010 | Lin et al. |
| 8,031,210 | B2 * | 10/2011 | Elsberg et al. ................ 345/632 |
| 8,339,418 | B1 | 12/2012 | Nesmith |

(Continued)

FOREIGN PATENT DOCUMENTS

WO  WO 2008/084937 A1  7/2008

OTHER PUBLICATIONS

International Search Report for Serial No. PCT/US12/67460 mailed Feb. 15, 2013.

(Continued)

*Primary Examiner* — Jose Couso
(74) *Attorney, Agent, or Firm* — Brooks Acordia IP Law, P.C.; Douglas N. Larson

(57) ABSTRACT

A system for generating automatically tracking mattes that rapidly integrates live action and virtual composite images.

34 Claims, 8 Drawing Sheets

(56) References Cited

U.S. PATENT DOCUMENTS

| | | | |
|---|---|---|---|
| 8,411,931 B2 | 4/2013 | Zhou et al. | |
| 8,824,861 B2* | 9/2014 | Gentile et al. | 386/278 |
| 8,860,712 B2* | 10/2014 | Lowe et al. | 345/418 |
| 8,867,835 B2* | 10/2014 | Flagg et al. | 382/173 |
| 2003/0095710 A1 | 5/2003 | Tessadro | |
| 2003/0202120 A1 | 10/2003 | Mack | |
| 2004/0023612 A1 | 2/2004 | Kriesel | |
| 2005/0168485 A1 | 8/2005 | Nattress | |
| 2006/0165310 A1 | 7/2006 | Mack | |
| 2007/0065002 A1 | 3/2007 | Marzell et al. | |
| 2007/0098296 A1 | 5/2007 | Souchard | |
| 2007/0248283 A1 | 10/2007 | Mack et al. | |
| 2007/0291233 A1 | 12/2007 | Culbertson et al. | |
| 2008/0252746 A1 | 10/2008 | Mack | |
| 2008/0278479 A1 | 11/2008 | Sun et al. | |
| 2009/0202114 A1 | 8/2009 | Morin et al. | |
| 2009/0209343 A1 | 8/2009 | Foxlin et al. | |
| 2009/0262217 A1 | 10/2009 | Mack et al. | |
| 2010/0189342 A1 | 7/2010 | Parr et al. | |
| 2011/0026014 A1 | 2/2011 | Mack et al. | |
| 2011/0038536 A1 | 2/2011 | Gong | |
| 2011/0128286 A1 | 6/2011 | Park et al. | |
| 2011/0128377 A1 | 6/2011 | Katz et al. | |
| 2014/0218358 A1 | 8/2014 | Mack | |

OTHER PUBLICATIONS

Written Opinion of International Searching Authority for Serial No. PCT/US12/67460 mailed Feb. 15, 2013.

Notification of Transmittal of International Preliminary Report on Patentability for Serial No. PCT/US12/67460 mailed Dec. 9, 2013.

Previzion product brochure entitled "Previzion Real Time Camera Tracking on Set Visualization Real time VFX", published on Apr. 8, 2011.

Non-Final Office action for U.S. Appl. No. 14/344,878 mailed Jun. 16, 2014.

Final Office action for U.S. Appl. No. 14/344,878 mailed Nov. 17, 2014.

Sony Eye Cam 2007, Sony Eye Cam specification describing an adjustable lens, Dec. 30, 2010, Archive of Amazon.com product sale page.

* cited by examiner

AUTOMATIC TRACKING MATTE SYSTEM

CROSS-REFERENCE TO RELATED APPLICATIONS

This application is a continuation of copending International Application No. PCT/US12/67460 filed Nov. 30, 2012 and which claims the benefit of provisional application Ser. No. 61/565,884, filed Dec. 1, 2011, and the entire contents of both of these prior applications are hereby incorporated by reference.

TECHNICAL FIELD

This invention relates to systems and methods for combining real scene elements from a video, film, digital type camera or the like with virtual scene elements from a virtual camera into a finished composite image, and more particularly, to systems and methods for creating drawn shapes that move along with the camera's motion to control how the virtual and real scene elements are combined.

BACKGROUND

The state of the art in combining real world imagery with additional imagery from another source is a process that requires careful control over which sections of each image are to be used in the final composite image. One common application is to combine images generated by a computer with images acquired from a traditional motion picture, video or digital camera. In order to seamlessly combine the images, the areas of each image that are to be preserved or modified must be defined. These areas are typically called mattes.

Mattes may be defined in a number of ways. In traditional compositing, the mattes are frequently defined by having an artist mark points around the perimeter of the object to be preserved or removed. The computer then connects the dots to form a closed shape, which forms the matte. Problems can arise, however, if the object and/or the camera move relative to the other.

In traditional computer compositing, a moving camera or object is handled by making a tracking matte, or a matte that moves along with the object. While the methods of moving the matte along with the object vary, they typically center around having the user specify an area of high contrast in the live action image, measuring how that image moves around in the frame, and connecting the motion of the drawn matte to the motion of the high contrast object.

This process works, but has several limitations. Firstly, if the high contrast area is located on the front of a character's shirt, for example, and the character turns around, or if the camera moves around to another side of the character, the local effect is destroyed. Secondly, the process of measuring the camera motion by tracking the individual pixels of the high contrast part of the image is both fragile and time-consuming if there is no additional camera data to work from. It typically cannot be computed in real time, and if a frame of the live action image has a lighting change where the pattern is unrecognizable, the artist must re-specify the high contrast area at the frame of failure to continue the process. The process of creating all of the multiple overlapping mattes that are used in a sophisticated visual effects shot can exceed the time required to complete the rest of the shot due to the handwork required.

In addition, if the live action camera is zoomed in, the high contrast area that was being tracked can simply disappear from the image, resulting in the matte failing to track the camera lens change.

Accordingly, the pixel tracking based methods do not work well for the demands of real time visual effects processing, which must be very rapid to compute as well as robust to the frame by frame changes in the live action video image.

In real time processing, mattes have traditionally been created by surveying the edges of the green screen background using an architectural measurement tool such as a total station, and creating a model of the matte in 3D space. However, models of this type cannot be rapidly modified by the artist under typical time pressure conditions found in entertainment production.

SUMMARY

Various embodiments of an automatic tracking matte system are disclosed herein. In one embodiment, an artist selects points on a computer screen to generate a rough outline around the object to be removed or preserved. These points are selected using a 2D display of the live action image, typically by locating a pointer in the desired location and pressing a selection button. The user clicks a mouse around the border of the object, and then selects the inside or the outside of the finished outline to determine on which side of the line the matte will be active. The user can also begin or end the outline at an edge of the screen, in which case the system extrapolates the matte for a given distance out from the edge of the screen. This distance can be five meters or more, generally between one and ten meters.

The above process generates a 2D outline. However, for the matte to track properly in a 3D space, the shape must be converted to a 3D representation. This 3D shape can be a set of attached polygons whose outer perimeter matches the outline of the points that the user selected. The 3D polygon mesh exists at a given point in 3D space. The 3D polygon mesh can be created in a plane normal to the axis of the main virtual camera when the matte is initiated, and at a distance specified by the user.

Since the mesh is created by drawing around a live action object, the 2D representation is viewed from the position of the current live action camera. For the 3D mesh to line up accurately, it can be projected from a virtual camera with the same position and orientation as the live action camera. In addition, the further away from the camera the polygon mesh is moved, the larger it must become for the 2D points to remain in the same relative position on the live action image. This computation can be done automatically by geometric projection as the user moves the 3D polygon mesh closer or further away from the virtual camera. This automatic calculation can take into account the current position and orientation of the virtual and live action cameras, the current focal length and distortion of the cameras, and the sensor size of the cameras.

After creating the mesh, the user will frequently need to adjust the position and/or shape of an existing mesh. The camera may have moved in this interval, but to keep the points aligned correctly with the original object, the normal along which the 3D mesh is scaled up or down must be known. The mesh points can be manipulated by the artist directly in the 2D user interface, but may be constrained to move only in the original 3D plane in which they were created.

According to an aspect of the disclosure a unified matte system is created with individual points that are entered either on the screen in a 2D form as described herein, or directly in 3D from survey coordinate data. Once a given polygon is entered, the various points can be forced into a plane. This plane then defines where the individual points can move when later edited. Thereby, the artist can simply click and drag on an existing matte point to edit it, knowing that it will stay in the plane in which it was created.

According to one aspect of the disclosure the 3D mesh object(s) is (are) rendered in separate passes, and grouped together to form the overall set of despill, garbage, or other types of mattes.

According to another aspect of the disclosure the points of the mesh can also be entered using 3D survey data. This 3D data can be determined in a variety of ways, including photogrammetry techniques and laser surveying instruments such as a total station. In this embodiment, the first three entered points of survey data can be used to set the plane of the rest of the entered survey points of that polygon.

According to a further aspect of the disclosure the mesh can be made to move along with a separate form of tracking. For example, a separate motion capture system can measure the 3D location of a person, face, or object in real time, and locate the 3D matte mesh at the location of the person.

According to a still further aspect of the disclosure the basic matte shape can be used for many different applications such as a garbage matte (removal of foreground), a despill matte (removal of extra blue or green color), a color grading matte (selective enhancement of one area of the scene's color), and so forth.

According to a yet still further aspect of the disclosure the matte distance set can be set automatically by measuring the distance from the camera to the subject, such as by acoustic or optical methods, or by measuring the current focus distance from the lens system.

According to an aspect of the disclosure a method for creating mattes whose shape can be drawn by an artist, but which tracks automatically as the camera or object moves, is provided.

According to another aspect of the disclosure the computations required to move the mattes can be performed in real time.

According to a further aspect of the disclosure the matte tracking can automatically handle variations in lens focal length or distortion.

According to a still further aspect of the disclosure the matte data can be entered in standard 3D survey coordinate form and rapidly modified by the artist during production.

According to another aspect a matte tracking method can be achieved with data that is already existing in a real-time compositing and camera tracking system.

BRIEF DESCRIPTION OF THE DRAWINGS

The foregoing and other features and advantages of the present invention will be more fully understood from the following detailed description of illustrative embodiments, taken in conjunction with the accompanying drawings.

DETAILED DESCRIPTION

The following is a detailed description of the presently known best mode(s) of carrying out the inventions. This description is not to be taken in a limiting sense, but is made merely for the purpose of illustrating the general principles of the inventions.

A rapid, efficient, reliable system is disclosed herein for generating an automatically tracking matte that significantly speeds the integration of live action and virtual composite images. Applications ranging from video games to feature films can implement the system in a fraction of the time typically spent tracking multiple areas of high contrast in the image by hand. The system thereby can greatly reduce the cost and complexity of controlling matte motion, and enables a much wider usage of the virtual production method.

Since the present process is primarily for joining live action with computer-generated elements, its applications for video games may be limited. The process can work with a real-time video feed from a camera, which is presently available on most "still" cameras as well. The process can work with a "video tap" mounted on a film camera, in systems where the image is converted to a standard video format that can be processed.

An objective of the present disclosure is to provide a method and apparatus for creating automatically tracking mattes for a live action subject that enable rapid control over how different areas of the image are processed.

Figure 1:
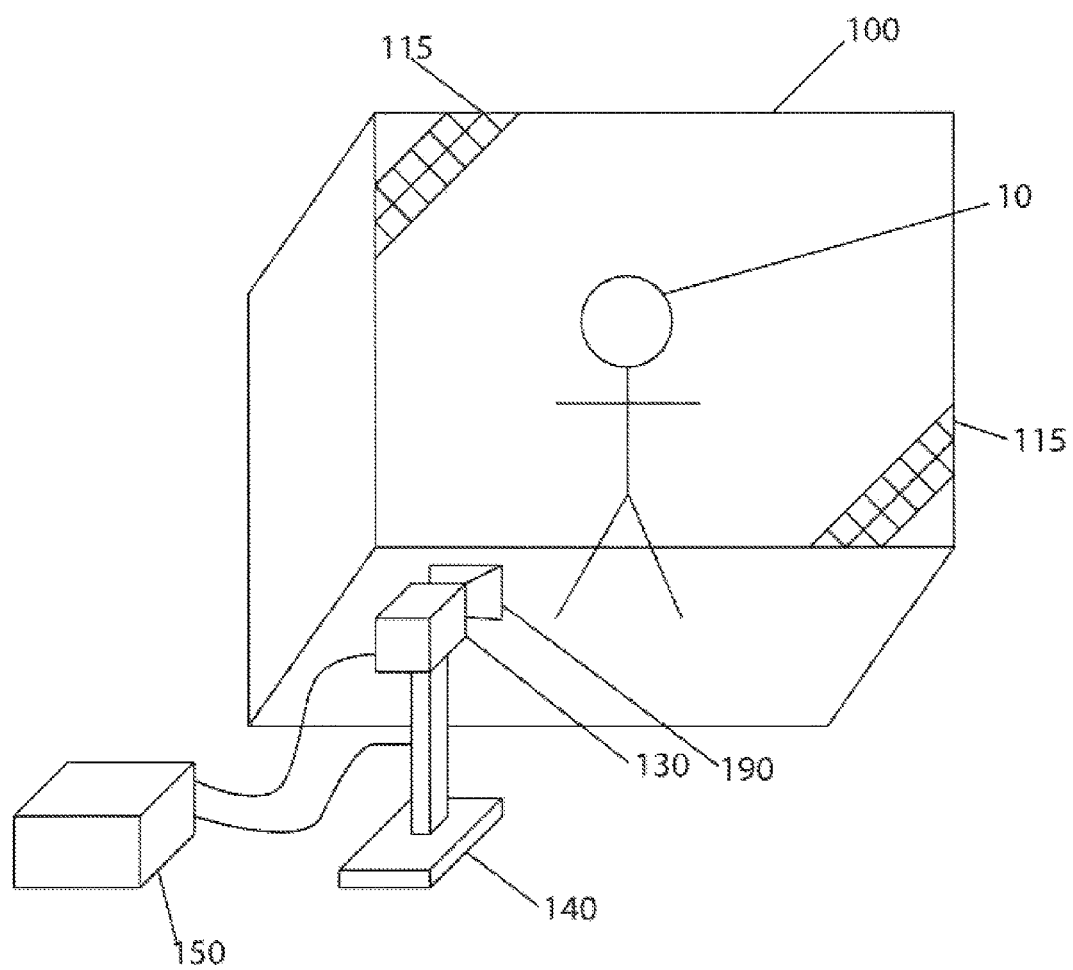
FIG. 1 is a perspective view of an embodiment in accordance with the present disclosure.

Referring to FIG. 1, an embodiment of the present disclosure is depicted. A scene camera 130 with a lens 190 is positioned to capture a live action image 20 of a subject 10 in front of a background 100. The subject(s) 10, for example, can be actors, props, and physical sets. The background 100 may have obstructions 115 that may cause problems with the keying process. Per an aspect of the disclosure, the obstructions 115 can be dealt with by creating matte objects of this disclosure.

The scene camera 130 can be mounted on a camera tracking system 140. And this camera tracking system 140 can be an encoded pedestal, dolly, jib, crane, or any other form of camera position, orientation, and field-of-view measuring system. Focus distance may also be measured, as the parameters of a lens can change while focusing. There may be more than one scene camera to enable different views of the subject's performance to be captured.

Figure 8:
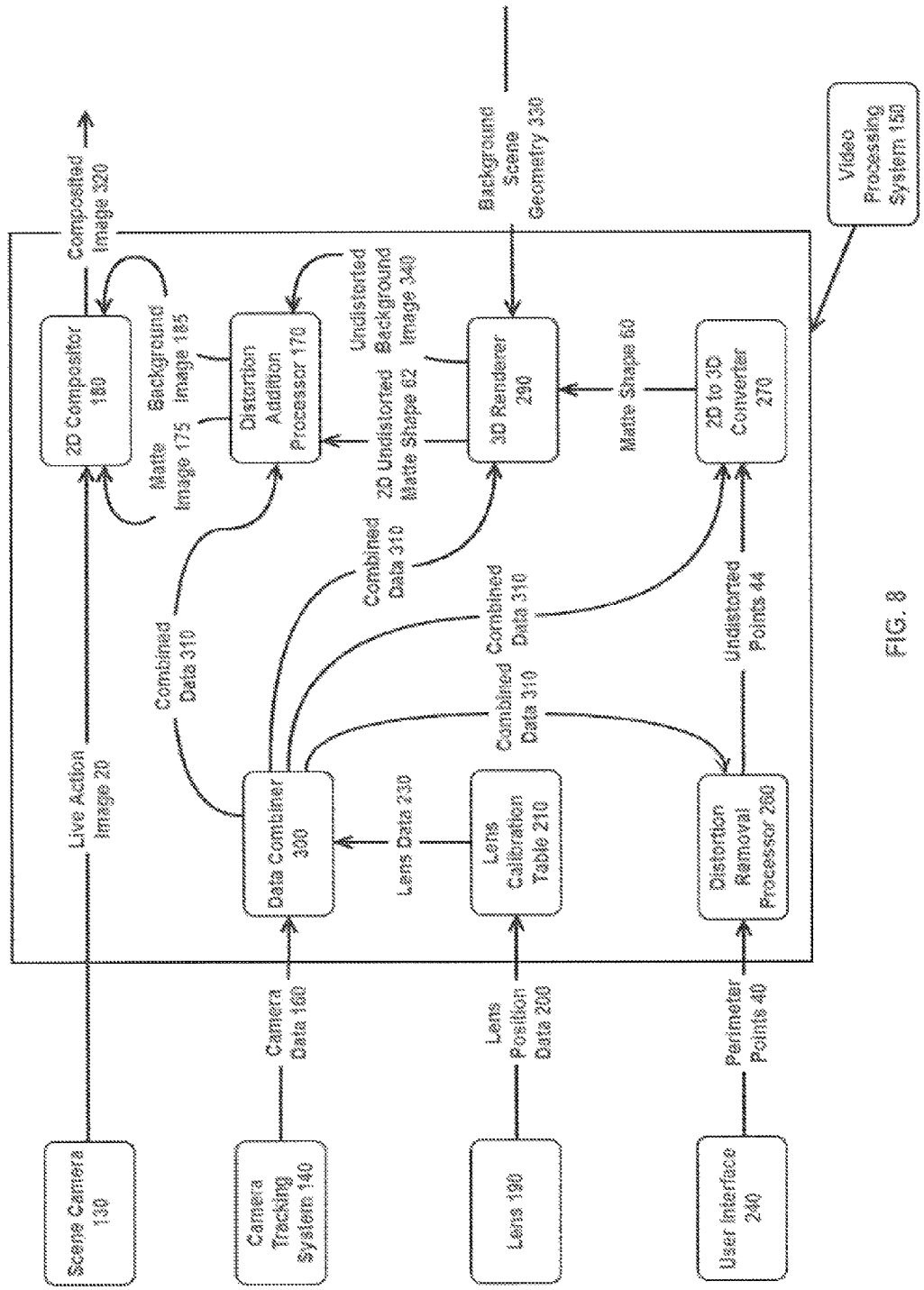
FIG. 8 is a block diagram that depicts the data flow through a system of the present disclosure.

The scene camera 130 and the camera tracking system 140 are connected to a video processing system 150, as depicted in FIG. 8. The video processing system 150 takes the incoming live action video image 20, generates the corresponding background virtual matte shape 60, and performs the automatic tracking matte process using the two images. The video processing system can include a computer with a live video input, a camera tracking data input, and a video card capable of processing 2D and 3D computer graphics calculations.

Figure 2:
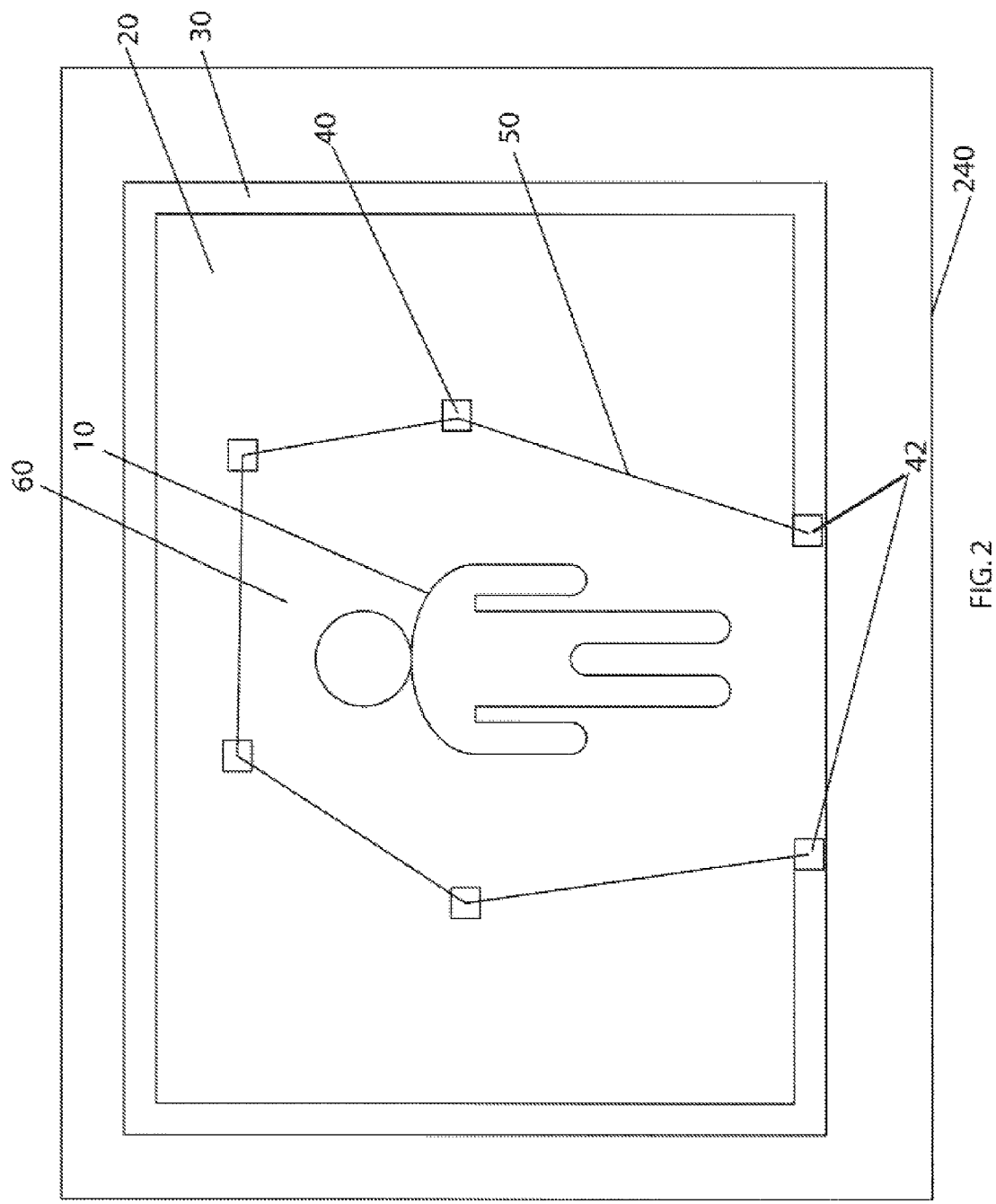
FIG. 2 is a front view of a live action image with a set of points around it representing a rough matte outline in accordance with an embodiment of the present disclosure.

An embodiment of the present disclosure is illustrated in FIG. 2. A live action subject 10 is shown in the center of a live action image 20 with a perimeter 30 around the edge. A matte shape 60 is displayed along with the live action image 20 in a user interface 240. The matte shape 60, outlined by a set of points 40 connected by segments 50, is drawn around subject 10. Perimeter points 42 are similar to points 40, but are located within the boundary set by perimeter 30. The user selects the location of points 40 one at a time by clicking on the screen.

Pursuant to one embodiment, if the user starts and ends the shape by creating a perimeter boundary point 42 within the perimeter 30, the matte shape 60 will extend off the screen in the direction of the lines 50 as they extend off the screen. On the other hand, if the user selects the start point after selecting several other points, the program will recognize this as a closed ring.

Once the matte outline 50 has been defined, the user selects whether the matte shape 60 is to be on the inside or the outside of the outline 50. This can be done by detecting to which side of the closed shape that the user moves the mouse pointer, and then clicks to set the inside or the outside of outline 50 to select.

Figure 3:
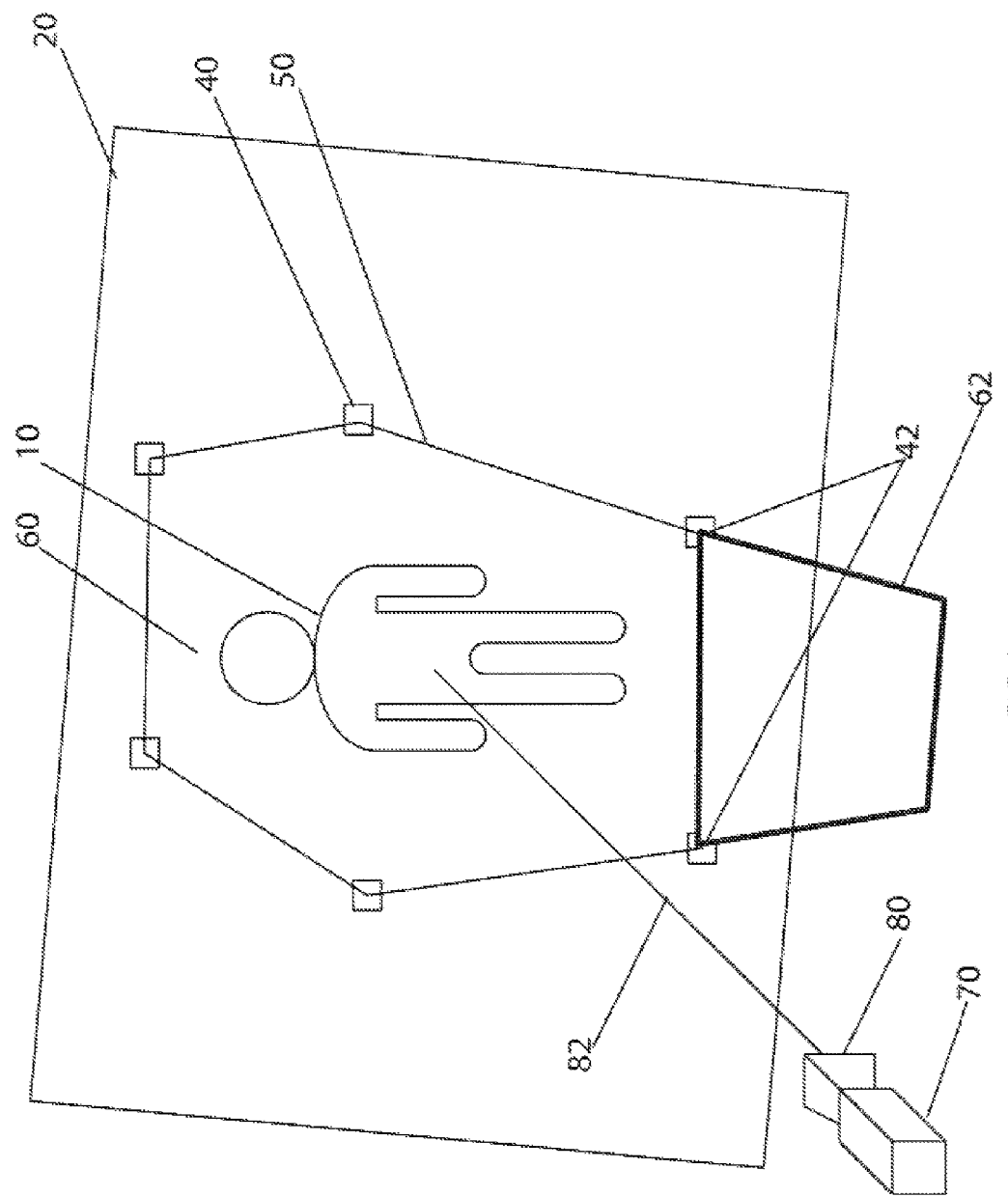
FIG. 3 is a perspective view of a 3D compositing scene in accordance with the present disclosure.

The display in the user interface is 2D, but for correct alignment, all of the various components exist as 3D objects in a virtual scene. Referring to FIG. 3, the transformation of 3D to 2D coordinates can be done using standard projection geometry calculations that are well known to those skilled in the art. A virtual camera 70 has a frustum 80 that describes the field of view of the virtual camera. The parameters of virtual camera 70 and frustum 80 match the parameters of the live action camera 130 and the lens 190.

A live action image 20 containing a subject 10 is located at a distance from virtual camera 70, and is centered on the optical axis 82 of the virtual camera. The size of the live action image 20 in the virtual space is determined by its distance from virtual camera 70; the further away the live action image is placed in the virtual space, the larger the image must be to fill the view angle described by virtual frustum 80. The matte shape 60 is shown as located in the 3D space in between virtual camera 70 and live action image 20. Since the user controls the distance between virtual camera 70 and matte shape 60, the matte shape can also be located further away from the virtual camera than live action image 20. In this image (see FIG. 3), an automatic extension 62 of matte shape 60 is seen; this extrapolates the direction of segments 50 that end in perimeter points 42 to go past the limits of the screen. The automatic extension 62 can extend five meters, for example, past the original visible edge of matte shape 60.

The orientation of matte shape 60 can be created perpendicular to the optical axis 82, and at a user specified distance from the virtual camera 70. Thereby, the user can measure out how far away the live action subject 10 is, enter that distance into the interface, and know that the matte shape 60 is being created at a matching distance from the virtual camera 70.

When entered as 2D points on a plane normal to the user's viewing axis, the points 40 all lie on the same plane. Matte shape 60 can also be created using direct input of 3D survey data, measured with an architectural survey tool such as a total station. The entered points of matte shape 60 can be forced to lie on the same plane by using the first three entered points to set the plane definition, with additional entered points projected into that plane to enforce planarity.

Figure 4:
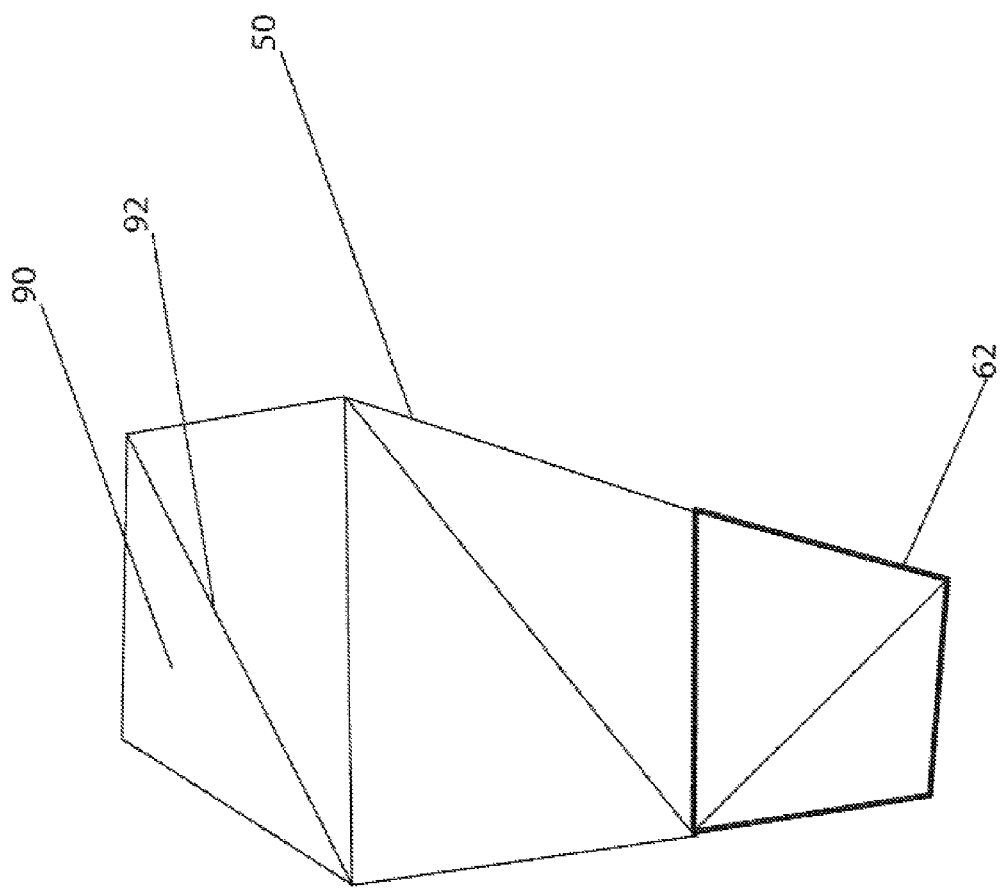
FIG. 4 is a perspective view of a polygon mesh in a 3D compositing scene in accordance with the present disclosure.

To correctly render a 3D shape, the outline can be broken up into individual triangular elements. FIG. 4 demonstrates an embodiment of this method. The outline 50 is automatically converted into a set of polygons 90 with internal edges 92 using an automatic tessellation routine. The automatic extension 62 is similarly tessellated. This automatic tessellation routine can be done using an algorithm called Delaunay triangulation as is well known to practitioners.

Figure 5:
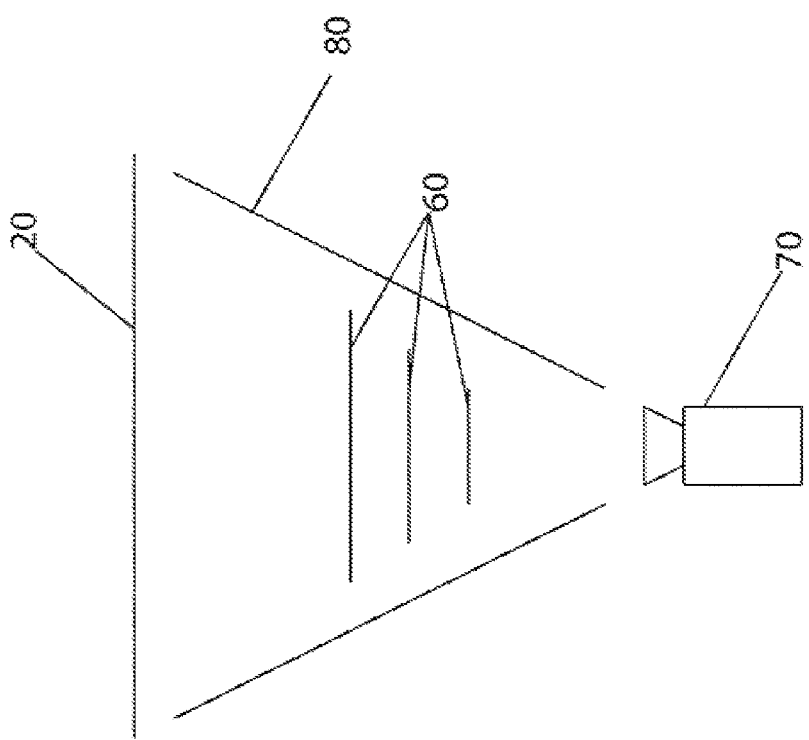
FIG. 5 is a top view of a 3D compositing scene in accordance with the present disclosure.

As the user can adjust the distance of the matte shape 60 from the camera, the size of matte shape 60 must increase and decrease as it is moved closer to or further away from the virtual camera 70. FIG. 5 demonstrates an embodiment of this process wherein virtual camera 70 and virtual frustum 80 are viewed from the top down to make their geometry clearer. Three positions of matte shape 60 are shown increasing and decreasing in size as they are closer or further away from virtual camera 70. The size of matte shape 60 is scaled in proportion to the viewing angle or field of view of virtual frustum 80.

The user can also adjust the overall matte shape 60 by moving the points 40 after the original shape has been created. The points 40 can be constrained to their original created plane in 3D space as they are moved around. This enables the artist to manipulate points using a convenient interactive 2D interface common in computers, but have the points stay in the correct 3D plane.

In some cases the matte shape 60 will need to move along with the subject 10. This can occur when a foreground subject 10 is moving. (On the other hand, the matte shape does not need to move when it is drawn around a background object, such as a green screen wall, that does not move.)

Figure 6:
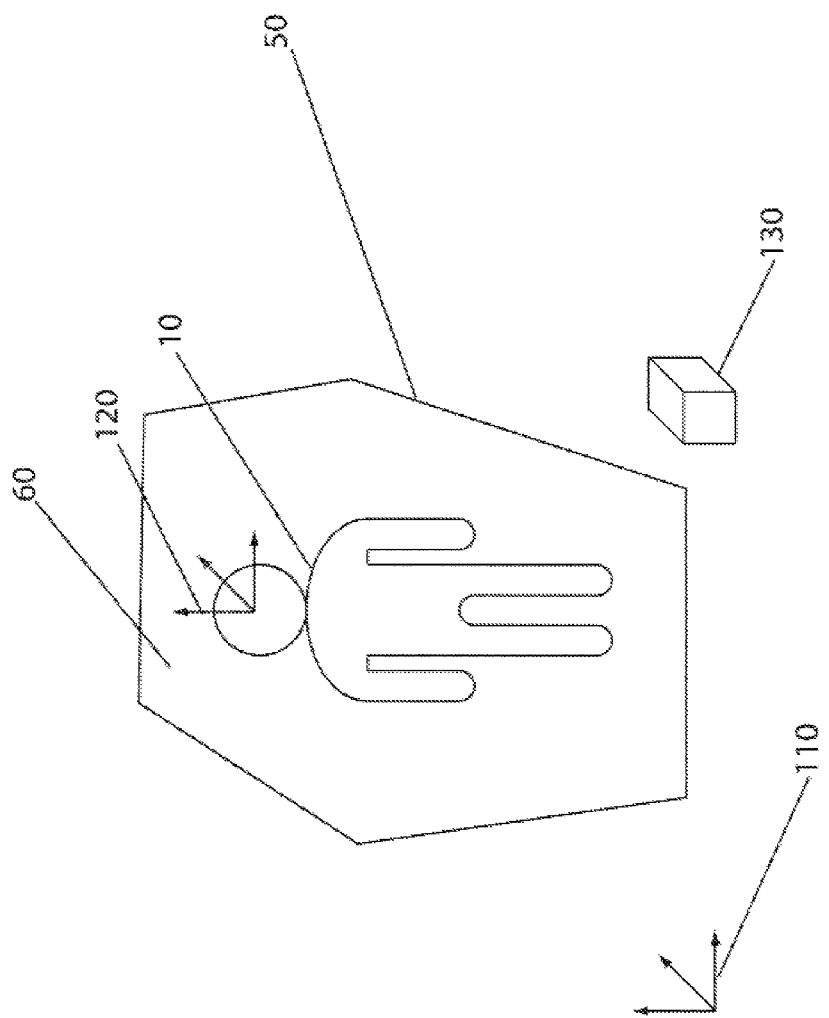
FIG. 6 is a perspective view of a live action environment located within a coordinate system in accordance with the present disclosure.

Referring to FIG. 6, a 3D tracking device 130 can be used to measure the position 120 of the subject 10 in the stage. The position 120 of subject 10 is measured with respect to a coordinate system 110. This coordinate system 110 can be located identically to the virtual coordinate system used for the rest of the background. The 3D tracking device 130 can be any type of system that can resolve the location of the subject 10 on the stage; and as an example it can be a markerless motion capture system. Since the position 120 of the subject 10 is known by the system, the position of matte shape 60 can be connected to the position 120 of subject 10, with the result being that the movement of matte shape 60 will be locked to subject 10 even as both subject 10 and virtual camera 110 move around the scene. The orientation of matte shape 60 can change to remain normal to the virtual camera 70 as it is moved.

Figure 7:
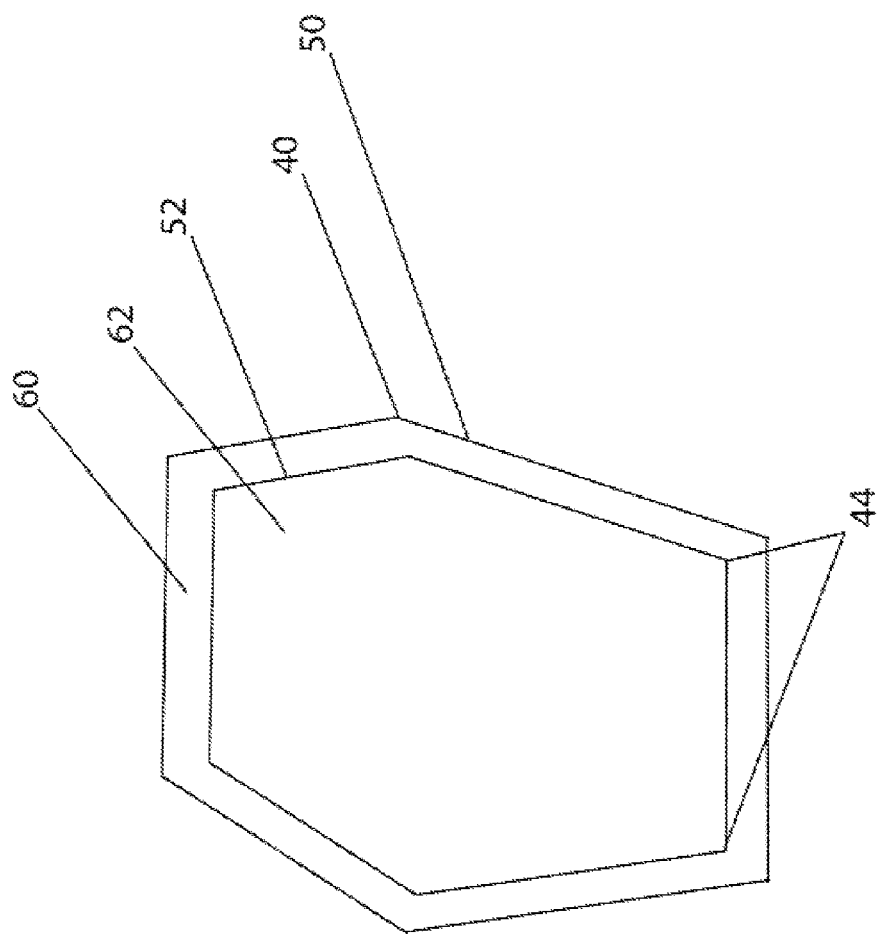
FIG. 7 depicts a matte outline before and after applying lens distortion, which uses the present disclosure to generate an automatically tracking matte.

All physical lenses exhibit distortion, which must be handled to correctly match the matte shapes to live action, an example of which is shown in FIG. 7. As before, matte shape 60 is created by connecting segments 50 together and the end points of segments 50 are the selected points 40. However, the live action image from which the user is selecting points 40 has lens distortion. To create a correct matte object 60 that works correctly in 3D coordinate space, the selected points 40 in the interface have distortion, which is removed before being converted to a polygon mesh.

To render a matte shape 60 that correctly fits to distorted points 40, an undistorted matte shape 62 is created by generating undistorted points 44 based on applying lens distortion removal calculations to the original segment points 40, and connecting them with undistorted segments 52. The calculation of undistorted points 42 on the X,Y plane of the user interface and the rendered matte from the original points location can be computed with the following equations:

$$X\text{undistorted} = X\text{distorted} * (1 + K1 * \text{radius}^2)$$

$$Y\text{undistorted} = Y\text{distorted} * (1 + K1 * \text{radius}^2)$$

The value of K1 can be generated by a lens calibration system that measures the current distortion of the physical lens at its current setting. An example of a lens calibration system is described in U.S. patent application Ser. No. 12/832,480, which was published as U.S. Patent Publication No. 20110026014 and whose entire contents are hereby incorporated by reference. The conversion of the undistorted points 42 and segments 52 into 3D coordinates can be completed with standard projection geometry calculations well known to practitioners in the field. To then display the correctly distorted matte shape 60, the undistorted matte shape 62 can be rendered in 2D space and the reverse of the above distortion calculations can be applied to it. In this way, the undistorted matte shape 62 is properly displayed no matter what the current live action lens is doing.

The data flow of the system is illustrated in FIG. 8. A number of the processing steps described in earlier figures are combined into the video processing system 150. A scene camera 130 transmits a live action image 20 to 2D compositor 180. Camera tracking system 140 measures and transmits camera data 160 to data combiner 300. Lens 190 transmits lens position data 200 to the lens calibration table 210. Lens calibration table 210 looks up the appropriate lens data 230 and transmits that data to data combiner 300. Data combiner 300 then transmits the combined camera and lens data 310 to the 3D renderer 290, to distortion removal processor 260, to 2D-to-3D converter 270, and to distortion addition processor 170.

The user clicks perimeter points 40 and perimeter boundary points 42 on the user interface 240, which transmits these points to the distortion removal processor 260. Using the combined data 310, which includes lens data 230, the distortion removal processor 260 creates a set of undistorted points 44 that are transmitted to the 2D-to-3D converter 270. The distortion removal processor 260 can use the distortion algorithms mentioned with respect to FIG. 7. Using the current camera and lens data contained in combined data 310, the 2D-to-3D converter 270 calculates the matte shape 60 and sends it to 3D renderer 290. The calculation of the 3D matte geometry based on the undistorted points 44 and the combined data 310 can use projection geometry calculations that are well known to those skilled in the art.

3D renderer 290 can use matte shape 60 and the combined camera and lens data 310 to place a virtual camera 70 and frustum 80. The 3D renderer generates a 2D undistorted matte shape 62. The creation of a 2D undistorted shape from 3D geometry is essentially the reverse of the 2D-to-3D conversion mentioned in the previous paragraph, and is well known to those skilled in the art. The 3D renderer 290 then sends the 2D undistorted matte shape 62 to the distortion addition processor 170. The distortion addition processor 170, using the lens data 230 contained in combined data 310, creates a distorted 2D matte image 175 and sends it to 2D compositor 180. The calculations to add this distortion can be the same as described for FIG. 7.

A goal of this 2D-to-3D and 3D-to-2D conversion is to allow the user to select and manipulate points on a 2D user interface 240 containing live action image 20 that actually generate correct matte shape 60 which when rendered with the same lens distortion as the live action image 20, results in a matte image 175 that lines up with the original perimeter point 40 selected by the user. Otherwise, the matte image 175 would appear in a different place than that selected, and this would be a frustrating interface for the user.

The same rendering and distortion addition process can be used to create virtual background scenes that will be combined with the live action image 20 in the 2D compositor 180. Background scene geometry 320 from an external 3D content creation software program such as Maya is loaded into the 3D renderer 290, which generates an undistorted background image 340. This is sent to the distortion addition processor 170, which then applies the same lens distortion addition used for the matte image 175 to result in background image 185.

2D compositor 180 uses the matte image 175 to selectively process portions of the live action image 20 in combination with background image 185 to generate a composited image 320. (The composited image 320 can be delivered in the form of a live action actor placed into a virtual background, for example.) Because of the correct removal, rendering, and addition of lens distortion information, the user simply clicks on perimeter points 40 and they appear correctly on the screen of the user interface 240 in the expected position. This is because they have been correctly converted to accurate 3D spatial coordinates and re-drawn with matching lens and camera data. Thus, the convenience of 2D drawn mattes is preserved, while operating in a fully-tracked 3D world, which is needed for complex real-time visual effects.

According to one program of a system of this disclosure, the following prompts are provided to the user at the user interface: selectable and draggable points that overlay a live action image. An alternative program provides the following prompts: numerical XYZ entry fields for direct input of 3D coordinate points.

The resulting drawn or surveyed mattes can be used in a variety of manners. The mattes can be used as a garbage matte or a despill matte.

Garbage mattes are used to completely remove unwanted sections (like a hanging microphone in front of the green screen) of the live action image. The garbage mattes replace that part of the live action image with the computer-generated image underneath.

On the other hand, despill mattes are used to preserve part of the foreground image from being keyed (the green area made transparent), but still "clamping" the green (limiting the green level to the largest of either the red or the blue levels) to remove the greenish cast that otherwise permeates all through the image from the reflected light off the green screen. An example is a green screen placed outside a window, but the green reflects onto a glass table indoors, making it green. A despill matte removes the green tinge from the glass top, but without making it transparent. That is, a despill matte defines the part of the live action foreground to apply only the despill process, as opposed to the keying process, both of which are well known to practitioners in the art.

An alternative embodiment is the creation of the 'holdout' matte. This is typically based on live action objects in the scene, and is used to force virtual objects to be behind the live action objects, or to enable virtual objects to cast virtual shadows on live action objects. This is the area of use most likely for 3D mattes generated from natural feature tracking.

In addition, the 3D objects that are used to describe the matte positions can be saved and exported to external applications for post-production. They can be saved into a Collada or other 3D file format that is easily imported into other standard visual effects applications.

Alternative embodiments include using the mattes to drive a color grading process, so that the matte defines the part of the image to which to apply a color transformation. In this way, the process of correcting images manually, shot by shot, can be heavily automated.

Additional alternative embodiments include the automated movement of different points in the matte according to different tracking points from a 3D tracking system, or using facial tracking connected to the main camera to drive the matte tracking to only track facial features.

Thus, systems of the present disclosure have many unique advantages such as those discussed immediately below. The artist can edit the 3D points by dragging them around in a 2D interface, while preserving their location on their original 2D plane. This gives the artist fast interaction, while avoiding confusing "out of plane" geometry. Using a 2D interface can be accomplished by real time undistortion and re-distortion, to create correctly matched geometry while providing a convenient, familiar 2D interface. Most compositors only work with 2D, and 3D can be confusing to them. Automatically extending the matte beyond the edges when using the perimeter points allows the compositor to extend the matte without requiring the camera operator to move back and forth. The system allows the mattes to be stored and exported for future use, which is particularly useful for example for the following applications: Nuke, After Effects, Shake, Flame, and Inferno.

A system of the present disclosure can include a graphics card or CPU that includes: (a) a distortion removal processor 260 programmed to create a set of undistorted points; (b) a 2D-to-3D converter 270 configured to use the set of undistorted points to calculate 3D matte geometry; (c) a 3D renderer 290 configured to use the 3D matte geometry to generate a 2D undistorted matte shape; (d) a distortion addition processor 170 programmed to use the 2D undistorted matte shape to create a distorted 2D matte shape; and (e) a 2D compositor 180 configured to use the distorted 2D matte shape to combine at least one portion of a live action image with at least one other image to generate a composited image. The composited image can be delivered in the form of a high definition serial digital interface signal to an external recording system. An example of a commercially available graphics card that can be so programmed is the Quadro card available from nVidia Corporation of Santa Clara, Calif.

The above-mentioned graphics card or CPU can also include data combiner 300 and lens calibration table 210, or the processes can be divided between a graphics card and a CPU.

The present automatic matte tracking system can be based on the prior art Previzion system, which is/was available from Lightcraft Technology of Venice, Calif. The Previzion system includes a camera tracking system, a lens calibration system, a real-time compositing system, and a built-in 3D renderer. The tracking mattes feature adds the ability to hand draw mattes in 2D on the screen, that are then converted into a 3D space by the system, enabling it to move automatically as the camera moves, and in real time. An example of a publication disclosing the prior art Previzion system is the Previzion product brochure, entitled Previzion Specifications 2011, published on Apr. 8, 2011, and whose contents are incorporated by reference.

An embodiment of the present system can be made by modifying the prior art Previzion system by adding a tab to the user interface where the user can create the present matte and adjust it. The prior art Previzion system can be adapted by the addition of the drawable mattes, the computations of their positions and orientations and their adjustments using the saved common plane of the 3D points.

Previzion is unique in that the 2D video processing and the 3D rendering are being done in the same product. In contrast, most other systems have separate consoles for 2D and 3D, which are used to separately create the 3D background virtual scene and merge it with the 2D live action scene.

However, the 3D box that has the tracking matte information can send it to the 2D box, in the form of another 2D video signal that is a black-and-white garbage matte. This would essentially be the 3D box rendering the matte shapes, as it does in the Previzion system, but the final image assembly would be done externally in another system (like an Ultimatte HD, which is available from the Ultimatte Corporation of Chatsworth, Calif.) that takes in both the black/white garbage matte signal and the live action blue or green screen signal.

Most Ultimatte/other third party keyers already have a live input for the garbage matte signal, so it is straightforward to interface the tracking garbage mattes of the present disclosure to external keyers. However, the 2D Ultimatte system has no user interface that can select points that are connected to the separate 3D rendering system, such as is described here.

The more complicated uses of the mattes (like despill, color correction, etc.) that are easy to do in Previzion can be re-created with an external keying system. They can be done, for example, by manually tracking points of high contrast in the 2D image in Nuke available from The Foundry Visionmongers Ltd. of London, UK, or similar compositing packages, and then creating outlines from these points. This is typically not a real time process, and requires days or weeks of work for a single shot.

Pursuant to an aspect of the present disclosure what the camera and camera lens are doing are knowable to the present system. Thus, 2D-3D and 3D-2D conversions can be done quickly while taking into account lens distortion. The distortion removal processor, 2D-to-3D converter, 3D renderer, distortion addition processor, and 2D compositor can all be performed on a graphics card of the system. A video I/O card handles the video input and output.

A program of the present disclosure can be delivered as an executable code that is installed on a target system. The same math can work in a browser as it is largely a matter of geometry and input.

Although the inventions disclosed herein have been described in terms of the preferred embodiments above, numerous modifications and/or additions to the above-described preferred embodiments would be readily apparent to one skilled in the art. The embodiments can be defined, for example, as methods carried out by any one, any subset of or all of the components as a system of one or more components in a certain structural and/or functional relationship; as methods of making, installing and assembling; as methods of using; methods of commercializing; as methods of making and using the terminals; as kits of the different components; as an entire assembled workable system; and/or as sub-assemblies or sub-methods. It is intended that the scope of the present inventions extend to all such modifications and/or additions and that the scope of the present inventions is limited solely by the claims set forth below.

What is claimed is:

1. A system comprising:
a video processor configured to convert a matte shape to 3D spatial coordinates and redrawn with lens and camera data matching the live action camera and lens and to use the matte shape to selectively process portions of a live action image in combination with at least one other image to generate a composited image; wherein the matte shape is defined by matte points lying in a plane normal to the line of sight of the live action camera.

2. The system of claim 1 wherein the live action camera has an adjustable lens.

3. The system of claim 2 wherein the matte points are manually-selected matte points.

4. The system of claim 1 wherein the matte shape is defined at least in part by a recording of the original camera location, focal length and distance between the camera and the plane of the matte at the time of matte creation.

5. The system of claim 1 wherein the matte shape is defined by a scaling of the matte shape proportionally to the original focal length of the camera and along the original camera axis as the user adjusts the matte distance after the matte has been created.

6. The system of claim 1 wherein the matte shape is defined by a translating the scene camera by the user, and then an adjusting of the distance of the matte plane from the original camera location until the matte points line up with their respective scene elements in the new camera position, thereby resolving the position of the matte shape with the object being outlined in 3D space.

7. The system of claim 1 wherein the matte shape is defined by a constraining of the drawn points so that the points can be moved closer or further away from the original camera location, but only along the optical projection axis of the original camera and constrained to a plane normal to that of the original camera axis at time of the matte was originally created.

8. The system of claim 1 wherein the user sets the matte distance by directly measuring the distance between the live action camera and the live action object that is to be matted at the time of matte creation.

9. The system of claim 1 wherein the at least one other image is a virtual background created with the same camera perspective as the live action foreground.

10. A method comprising:
selecting points on a computer screen to generate a rough outline around an object to be removed or preserved from a live action image from a live action camera;
the selecting including beginning or ending the outline at an edge of the screen;
using a computer, converting the outline to a matte that lies in a plane perpendicular to an optical axis of the live action camera;
the beginning or ending causing the matte to be automatically extended a predetermined distance out from the edge of the screen without requiring the camera to move back and forth; and
the matte being comprised of three-dimensional geometry in an arbitrary three-dimensional plane, so that areas extended past the geometry visible to the user are projected into three-dimensional space.

11. The method of claim 10 wherein the live action camera has an adjustable lens.

12. The method of claim 11 wherein the plane can be adjusted further or closer to the original live action camera location at time of matte creation.

13. The method of claim 1 wherein the selected points are scaled along the original camera's axis and focal length projection as the user changes the matte plane distance.

14. The method of claim 1 wherein the selected points are viewed from the new camera position with correct distortion of the lens in the new position.

15. The method of claim 11 wherein the matte can be scaled closer or nearer to the original camera location even after the scene camera has been moved, so that the user can triangulate the 3D position of the matte in space by aligning the matte to live action features in two camera locations.

16. The method of claim 11 wherein the selecting includes restricting the 2D dragging movement of the matte points within a plane normal to the original camera axis.

17. A method comprising:
manually generating a 2D outline on a computer screen around an object to be removed or preserved in a 2D display of a live action image from a live action camera;
using a computer, converting the 2D outline to a 3D mesh on a plane normal to the optical axis of the original live action camera location; and
projecting the 3D mesh from a virtual camera, which is defined in the computer, having the same position and orientation as the live action camera to line up the 3D mesh with elements of the live action image.

18. The method of claim 17 further comprising the 3D mesh at least approximately tracking the live action object as the live action camera is moved to a new position relative to the object, and the 3D mesh scaled relative to the original camera position, orientation and focal length until the 3D mesh aligns with the live action object from the new position, orientation and focal length of the live action camera.

19. The method of claim 18 wherein the tracking includes adjusting the location of the points of the outline in three dimensional space so that the 3D mesh scales as the distance from the original camera location changes.

20. The method of claim 17 wherein the 2D outline lies in a plane perpendicular to the line of sight of the live action camera.

21. The method of claim 17 wherein the generating includes manually adjusting the distance between the original camera position and the normal plane on which the selected matte mesh points are located.

22. The method of claim 17 wherein the projecting includes moving the live action camera to a new location, and adjusting the distance between the matte plane and the original camera until the matte points line up with the live action object in the new live action camera position and orientation, thereby locating the matte object in 3D space.

23. The method of claim 17 further comprising after the projecting the 3D mesh, manipulating the points in a 2D interface while constraining the points to move on a plane normal to the camera axis in which the points were originally created.

24. A method comprising:
manipulating a 3D object, which is defined in a computer, via a 2D interface by forcing 3D points to lie in a plane and calculating their 3D positions by dragging around a 2D dot on a 2D interface;
the plane being perpendicular to the tracked camera position from where the points were original drawn; and
setting the distance between the matte plane and the scene camera location by measuring the distance between the live action camera and the live action object using a measuring device.

25. The method of claim 24 wherein the measuring device is a ruler or an electronic rangefinder.

26. The method of claim 24 wherein the manipulating includes tracking at least approximately the 3D object by locating the 3D matte at approximately the same position as the actual live action object via direct measurement of the distance between the camera and the 3D object at time of the matte creation, or triangulating the distance to the 3D object by translating the scene camera and adjusting the distance between the matte object and the original camera until the matte object lines up with the live action object in the new camera position.

27. The method of claim 24 wherein the live action camera has an adjustable lens.

28. A method comprising:
generating a 2D outline around an object to be removed or preserved in a 2D display of a computer of a live action image from a live action camera;
using the computer, converting the 2D outline to a 3D mesh on a plane normal to the optical axis of the original live action camera location;
projecting the 3D mesh from a virtual camera, which is defined in the computer, having the same position and orientation as the live action camera to line up the 3D mesh with elements of the live action image; and
after the projecting the 3D mesh, manipulating the points in a 2D interface while constraining the points to move on a plane normal to the camera axis in which the points were originally created.

29. The method of claim 28 further comprising the 3D mesh at least approximately tracking the live action object as the live action camera is moved to a new position relative to the object, and the 3D mesh scaled relative to the original camera position, orientation and focal length until the 3D mesh aligns with the live action object from the new position, orientation and focal length of the live action camera.

30. The method of claim 29 wherein the tracking includes adjusting the location of the points of the outline in three dimensional space so that the 3D mesh scales as the distance from the original camera location changes.

31. The method of claim 28 wherein the generating includes manually adjusting the distance between the original camera position and the normal plane on which the selected matte mesh points are located.

32. The method of claim 28 wherein the projecting includes moving the live action camera to a new location, and adjusting the distance between the matte plane and the original camera until the matte points line up with the live action object in the new live action camera position and orientation, thereby locating the matte object in 3D space.

33. A method comprising:
manipulating a 3D object, which is defined in a computer, via a 2D interface on the computer by forcing the object's 3D points to lie in a plane and calculating their 3D positions by dragging around a 2D dot on a 2D interface;
the plane being perpendicular to the tracked camera position from where the points were original drawn; and
in the manipulating including using the computer to track at least approximately the 3D object by locating the 3D matte at approximately the same position as the actual live action object via direct measurement of the distance between the camera and the 3D object at time of the matte creation, or using the computer to triangulate the distance to the 3D object by translating the scene camera and adjusting the distance between the matte object and the original camera until the matte object lines up with the live action object in the new camera position.

34. The method of claim 33 wherein the live action camera has an adjustable lens.

* * * * *